(12) United States Patent
Futami et al.

(10) Patent No.: US 6,519,833 B2
(45) Date of Patent: Feb. 18, 2003

(54) METHOD OF MAGNETIZING PERMANENT MAGNET MOTOR

(75) Inventors: Toshihiko Futami, Fuji (JP); Yoshiaki Inaba, Fuji (JP); Kiyotaka Kawamura, Numazu (JP)

(73) Assignee: Toshiba Carrier Corporation, Tokyo (JP)

( * ) Notice: Subject to any disclaimer, the term of this patent is extended or adjusted under 35 U.S.C. 154(b) by 0 days.

(21) Appl. No.: 09/919,999

(22) Filed: Aug. 2, 2001

(65) Prior Publication Data
US 2002/0047766 A1 Apr. 25, 2002

Related U.S. Application Data

(63) Continuation of application No. PCT/JP00/00503, filed on Jan. 31, 2000.

(30) Foreign Application Priority Data

Feb. 2, 1999 (JP) ............................................. 11-025124

(51) Int. Cl.⁷ .............................. H02K 15/16; H01F 7/06
(52) U.S. Cl. ........................ 29/596; 29/598; 29/602.1; 29/606; 29/607
(58) Field of Search ...................... 29/596, 598, 602.1, 29/606, 607; 361/143, 147, 148

(56) References Cited

U.S. PATENT DOCUMENTS 3,727,302 A * 4/1973 Phelon ........................ 29/607

FOREIGN PATENT DOCUMENTS

| JP | 49-103102 | 9/1974 |
|----|-----------|--------|
| JP | 63-157646 | 6/1988 |
| JP | 2-110979 | 9/1990 |
| JP | 2-269431 | 11/1990 |
| JP | 3-118749 | 5/1991 |
| JP | 5-50961 | 7/1993 |
| JP | 9-182342 | 7/1997 |
| JP | 9-182388 | 7/1997 |
| JP | 10-126992 | 5/1998 |

* cited by examiner

Primary Examiner—P. W. Echols
(74) Attorney, Agent, or Firm—Foley & Lardner

(57) ABSTRACT

A method of magnetizing a permanent magnet motor involves inserting a spacer in between multi-layered windings (24Ua and 24Va) wound on a plurality of magnetic pole teeth when magnetizing an unmagnetized magnet (26), and removing the inserted spacer (28A) after finishing the magnetization. The spacer (28A) is also inserted in a space between two stator windings (24Ua, 24Va; 24Ub, 24Vb) wound on two magnetic pole teeth adjacent to each other, a magnet material is magnetized by electrifying the stator windings with a direct current in a state of the spacer (28A) being inserted, a permanent magnet is thus formed, and the spacer (28A) is removed after finishing the magnetization.

32 Claims, 6 Drawing Sheets

METHOD OF MAGNETIZING PERMANENT MAGNET MOTOR

The benefit is hereby claimed of the right to an earlier effective filing date based on PCT/JP00/00503 filed Jan. 31, 2000 (which was published in Japanese), which claims priority of Japanese Patent Application No. 11-25124 filed Feb. 2, 1999, as provided for in 35 USC §120. This application is a continuing application of the above-cited PCT application.

FIELD OF THE INVENTION

The present invention relates to a method of magnetizing a permanent magnet motor.

PRIOR ART

An electric motor for driving a refrigerating cycle oriented compressor involves the use of a permanent magnet motor 10 constructed of, as shown in FIG. 11, a stator 13 including U-phase stator windings 12Ua, 12Ub wound in multi-layers on, for example, six pieces of pole teeth 11, V-phase stator windings 12Va, 12Vb wound thereon and W-phase stator windings 12Wa, 12Wb wound thereon, and a rotor 15 including four pieces of permanent magnets 14 disposed at an angle of 90° in a peripheral direction inwardly of the stator 13.

The permanent magnet 14 is constructed by incorporating the stator 13 and the rotor 15 and thereafter magnetizing unmagnetized magnet materials provided in four circular arc holes 16 of the rotor 15 by flowing a large direct current through the stator windings.

For attaining this magnetization, as illustrated in FIG. 12, a DC power source 17 applies a DC voltage to between two arbitrary-phase winding terminals, e.g., a U-phase winding terminal 12U and a V-phase winding terminal 12V, and the direct current flows through the U-phase stator windings 12Ua, 12Ub and the V-phase stator windings 12Va, 12Vb. With this DC excitation, magnetic fluxes occur in the motor 10 as indicated by arrowheads in FIG. 13. Forces F attracting each other are produced in the windings through which the direct currents flow in the same direction as produced in the two adjacent-phase windings 12Ua, 12Va or the windings 12Ub, 12Vb by dint of interaction between those magnetic fluxes and the currents flowing through the windings, with the result that those windings 12Ua, 12Va, 12Ub, 12Vb might be deformed as illustrated in FIG. 14.

If quantities of these deformations are large, the windings of the phases different from each other come into contact with each other, thereby causing a dielectric breakdown. Besides, a large force is applied to a corner 19a of an insulating bobbin 19 wound with the windings and to a proximal portion of a flange, and these portions are flawed. Therefore, those stator windings 12Ua, 12Ub, etc. might undergo a ground fault.

SUMMARY OF THE INVENTION

It is a primary object of the present invention to provide a method of magnetizing a permanent magnet motor, which is capable of preventing stator windings, an insulating bobbin, etc. from being damaged when forming a permanent magnet by magnetizing an unmagnetized magnet material.

To accomplish the above object, according to one aspect of the present invention, a method of magnetizing a permanent magnet motor comprises a step of preparing an incomplete permanent magnet motor, which is constructed of a stator having stator windings wound in multi-layers on a plurality of magnetic pole teeth of a stator core respectively through an insulating bobbin, and a rotor including unmagnetized magnet material disposed in a rotor core, a step of inserting a spacer in a gap in a slot between the two stator windings wound on the adjacent magnetic teeth, a step of magnetizing the magnet material by electrifying the stator windings with a direct current in a state of the spacer being inserted therebetween, a step of removing the spacer after finishing the step of magnetizing, and thus forming a permanent magnet.

By removing the spacer, space substantially corresponding to the thickness of the spacer is formed between the windings so that the windings are effectively cooled. Further, when the motor according to the present invention is applied to an enclosed compressor, it is possible to flow the emitted coolant from the compressor through the space, thereby the motor windings are effectively cooled and to effectively separate the coolant from the lubricant.

According to the present invention, when magnetizing the unmagnetized magnet material, the stator windings and the insulating bobbin are prevented from being damaged, and it is also feasible to prevent a ground fault and a short-circuit fault of the stator windings.

The spacer may be inserted in between a pair of windings through which at least an electric current flows in the same direction among pairs of windings of adjacent slots.

A required sufficient peripheral thickness of the spacer may be on the order of 70%–110% of the gap between the stator windings.

DETAILED DESCRIPTION OF THE PREFERRED EMBODIMENTS

A first embodiment of the present invention will hereinafter be described with reference to FIGS. 1 through 6.

Figure 1:
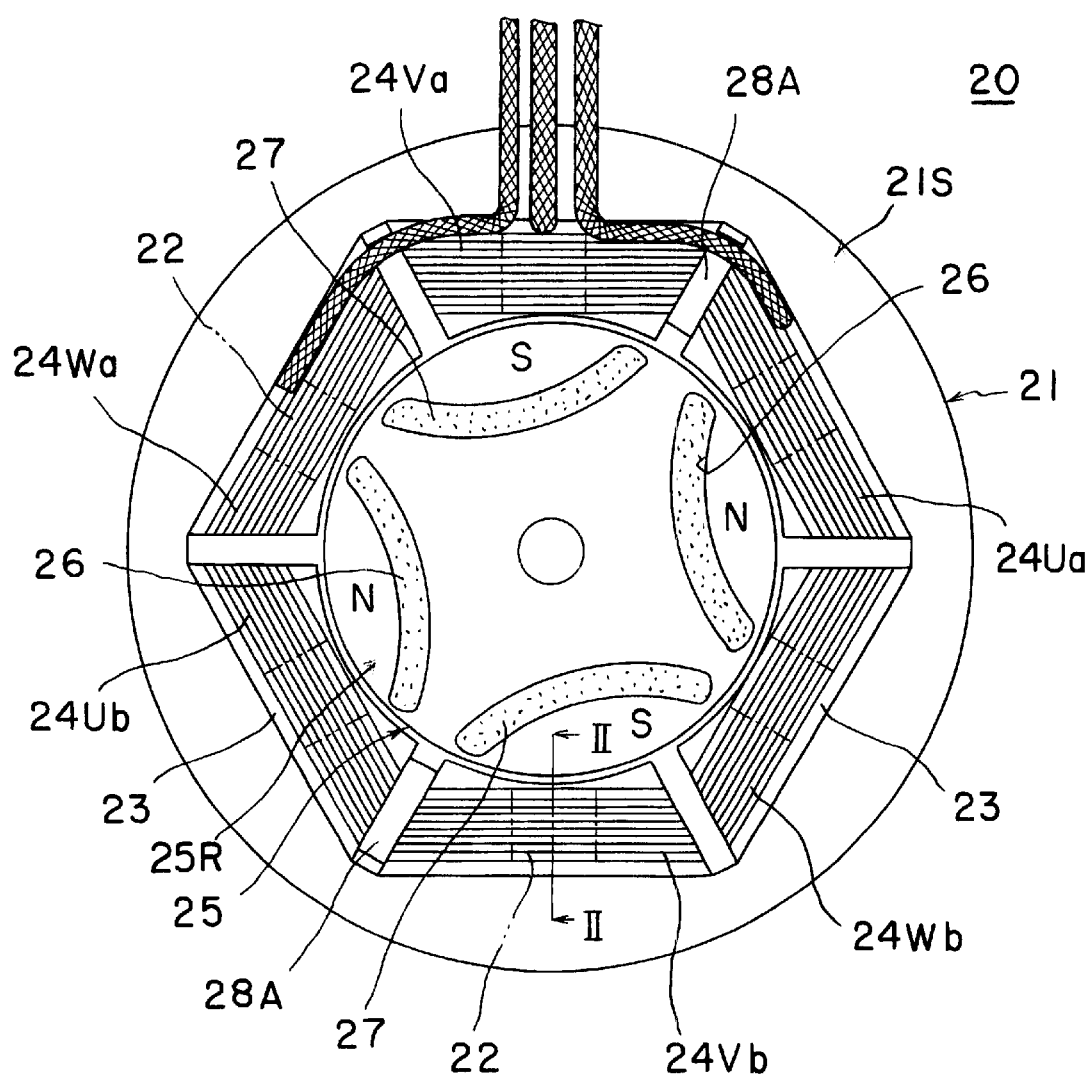
FIG. 1 is a view of a permanent magnet motor according to the present invention as viewed from an end surface.
Figure 2:
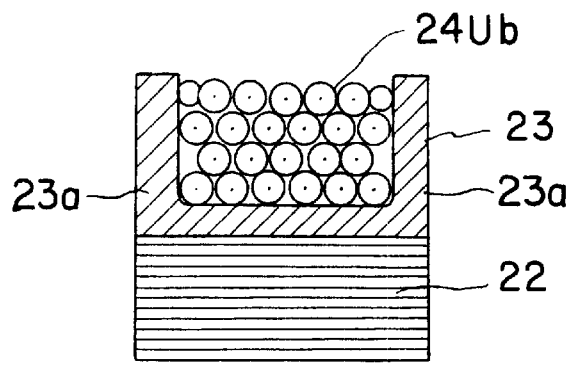
FIG. 2 is a sectional view taken along the line II—II in FIG. 1, showing the motor.

A permanent magnet motor 20 includes an annular stator 21S as shown in FIG. 1. The stator 21S has a stator core 21 constructed by laminating thin iron sheets. The stator core 21 is provided with a plurality of magnetic pole teeth 22 (six pieces of pole teeth are herein provided) disposed at equal intervals in a peripheral direction and extending inwards in a radial direction, and stator windings are wound thereon through an insulating bobbin 23. As illustrated in FIG. 2, the insulating bobbin 23 has flange members 23a, 23a formed on inner and outer peripheral sides thereof. U-phase stator windings 24Ua, 24Ub, V-phase stator windings 24Va, 24Vb and W-phase stator windings 24Wa, 24Wb are wound in multi-layers in sequence from the inner peripheral side between those flange members 23a, 23a. A rotor 25R is disposed inwardly of the annular stator 21S.

The rotor 25R includes a rotor core 25 constructed by laminating thin iron sheets. The rotor core 25 is formed with four circular arc holes 26 extending in an axial direction and disposed at equal intervals in the peripheral direction. Unmagnetized magnet materials 27 are set into these holes 26.

Figure 3:
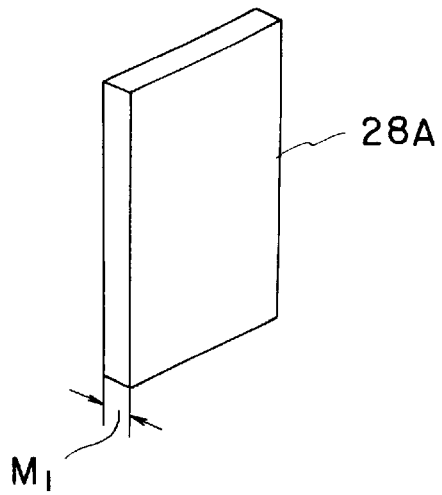
FIG. 3 is a perspective view showing one example of a spacer according to the present invention.

FIG. 3 shows a spacer 28A composed of an insulating material, which is inserted in between the windings 24Ua, 24Va and between the windings 24Ub, 24Vb in order to carry out the magnetizing method of the present invention. A peripheral thickness M1 of the spacer 28A is set to 70%–110% of a gap M between the multi-layered windings 24Ua and 24Va, etc. shown in FIG. 6. If the thickness M1 of the spacer 28A is less than 70% of the gap M between the windings, it is impossible to sufficiently restrain deformations of the windings, and an insertion operability, if over 110% of the gap M between the windings, worsens, with the result that the windings might be damaged.

Figure 4:
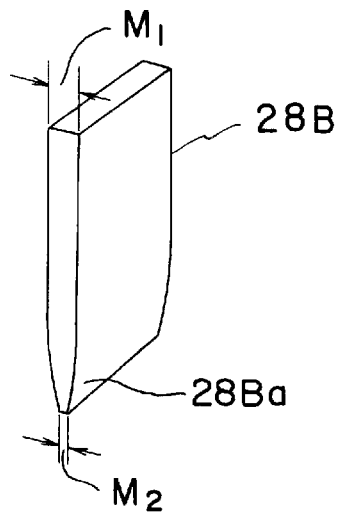
FIG. 4 is a perspective view showing another example of the spacer according to the present invention.
Figure 5:
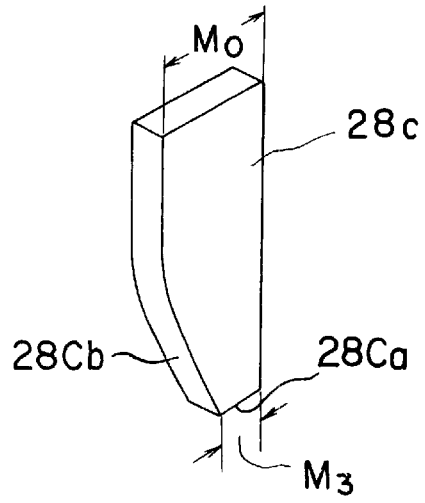
FIG. 5 is a perspective view showing still another example of the spacer according to the present invention.

The configuration of the spacer is not confined to what is shown in FIG. 3, for instance, configurations illustrated in FIGS. 4 and 5 may be adopted. A spacer 28B shown in FIG. 4 is formed so that a thickness M2 of a front end portion thereof is smaller than a thickness M1 of a principal portion thereof, and a tapered portion 28Ba is formed in the vicinity of the front end portion. The tapered portion 28Ba is tapered enough to easily get inserted in a narrow gap between the windings 24Ua, 24Va and enough to prevent the windings from being damaged when inserted in between the windings.

A spacer 28C illustrated in FIG. 5, a radial width M3 of a front end portion 28Ca is narrower than a width M0 of the principal portion, and an inclined portion 28Cb is formed in the vicinity of the front end portion. Even when a power source connecting line exists as an obstacle between the windings 24Ua and 24Va, a gap is formed on an outer peripheral side of the spacer 28C, and an easy insertion or removable can be attained while steering clear of the power source connecting line.

Next, the method of magnetizing the unmagnetized magnet material in the thus constructed permanent magnet motor 20, will be explained.

Figure 6:
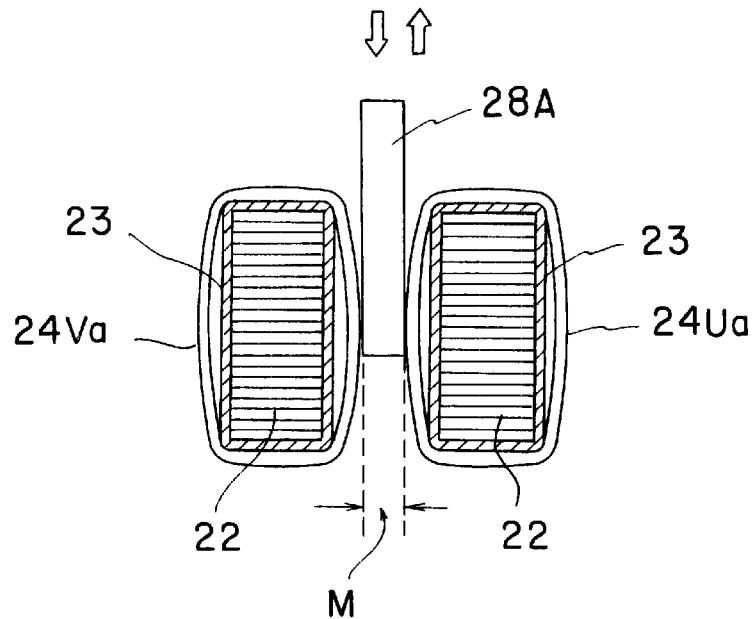
FIG. 6 is an explanatory view showing a method of inserting and removing the spacer according to the present invention.
Figure 12:
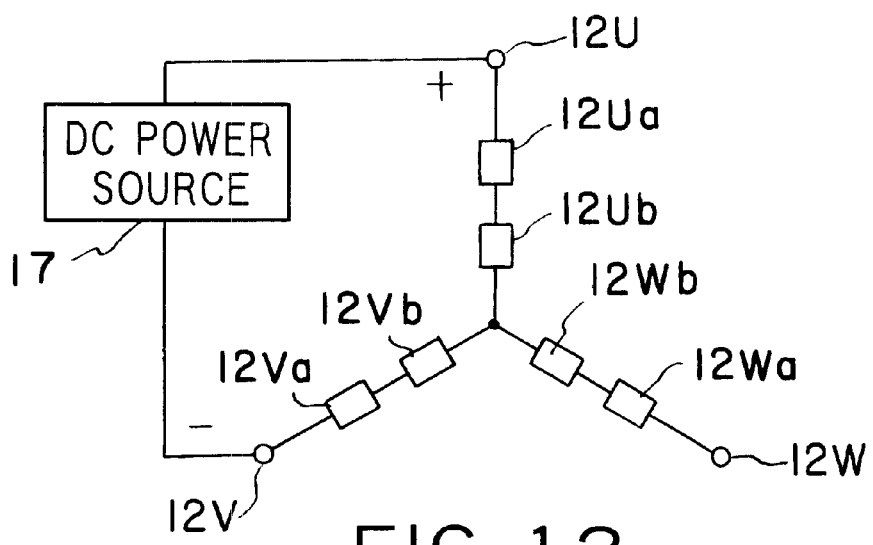
FIG. 12 is a view showing an example of connection when flowing a direct current to the stator windings for magnetization.
Figure 13:
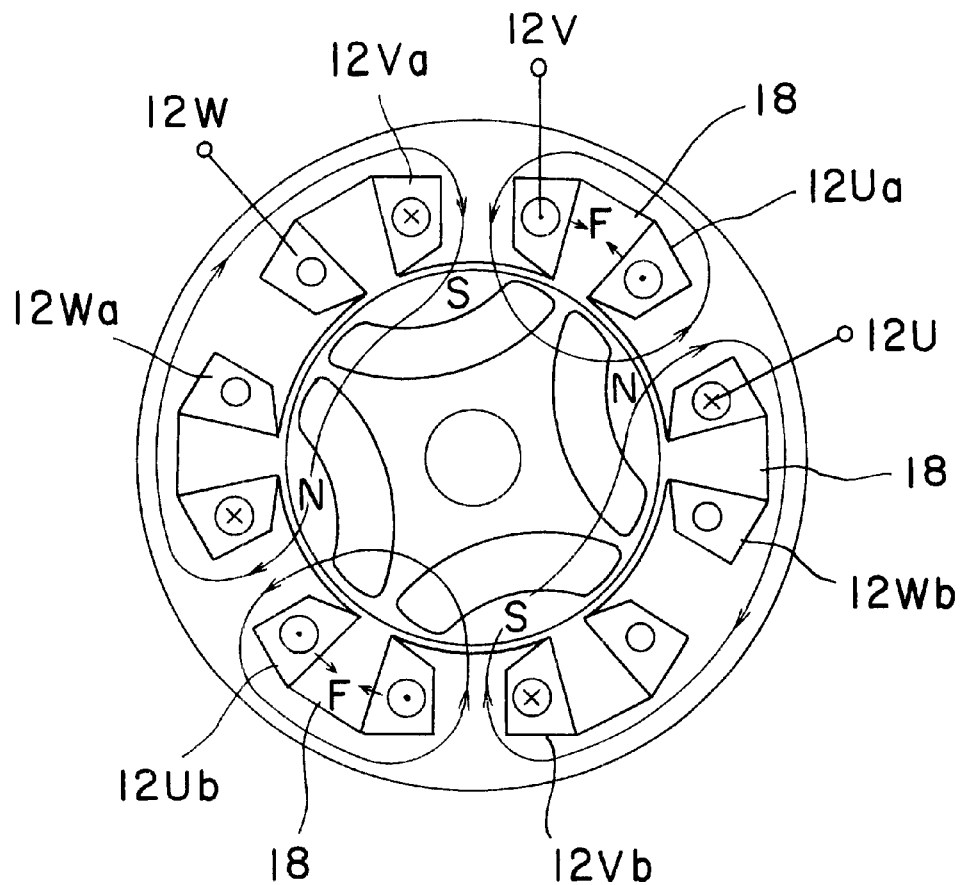
FIG. 13 is an explanatory view showing flows of magnetic fluxes in the motor when in a DC excitation.

Before executing the magnetizing process, the spacer 28A is, as illustrated in FIG. 6, inserted in between the windings 24Ua, 24Va and between the windings 24Ub, 24Vb on which attracting forces F act when in the magnetizing process. Upon a completion of such a preparation, a DC power source 17 applies a DC voltage to between arbitrary 2-phase winding terminals, e.g., a U-phase winding terminal 24U and a V-phase winding terminal 24V. Then, as in the case of FIG. 12, the electric current flows through the windings 24Ua, 24Ub, 24Vb, 24Va, and, as in the case of FIG. 13, the large direct current flows therethrough, thereby generating a strong DC magnetic field. The magnet material 27 is, as shown in the Figure, magnetized, thus obtaining a permanent magnet.

The large attracting forces F are generated in gaps between the different-phase windings 24Ua, 24Va and between the different-phase windings 24Ub, 24Vb, however, the spacers 28a are inserted in between those gaps, and hence the deformations of the windings can be prevented. It is therefore feasible to prevent the large force from being applied to the insulating bobbin 23, an occurrence of flaws, the winding 24Ua, 24Va, etc. from coming into contact with each other, and further a short-circuit between the windings and a ground fault from occurring.

After finishing the magnetizing process, the spacer 28A are removed, and the permanent magnet motor 20 can be herein completed.

Figure 7:
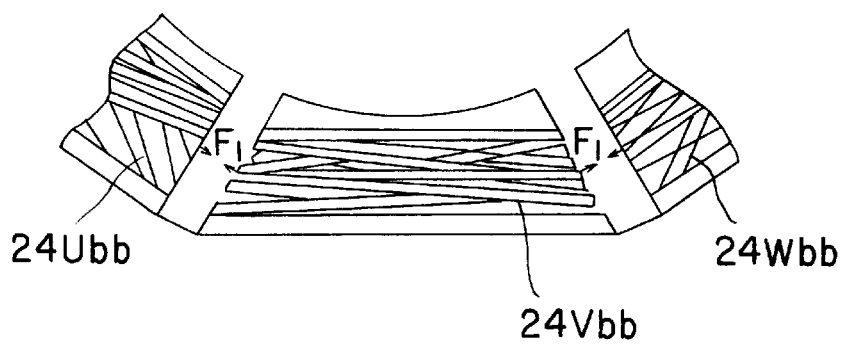
FIG. 7 is a view showing some of stator windings of the motor according to the present invention.

FIG. 7 illustrates a second embodiment of the present invention. Herein, phase stator windings 24Ubb, 24Vbb, 24Wbb are not wound in the complete alignment as shown in FIG. 2, but at least some of the windings are random wound coils, to be more specific, some of the lower- and upper-layered windings are crossed.

Figure 14:
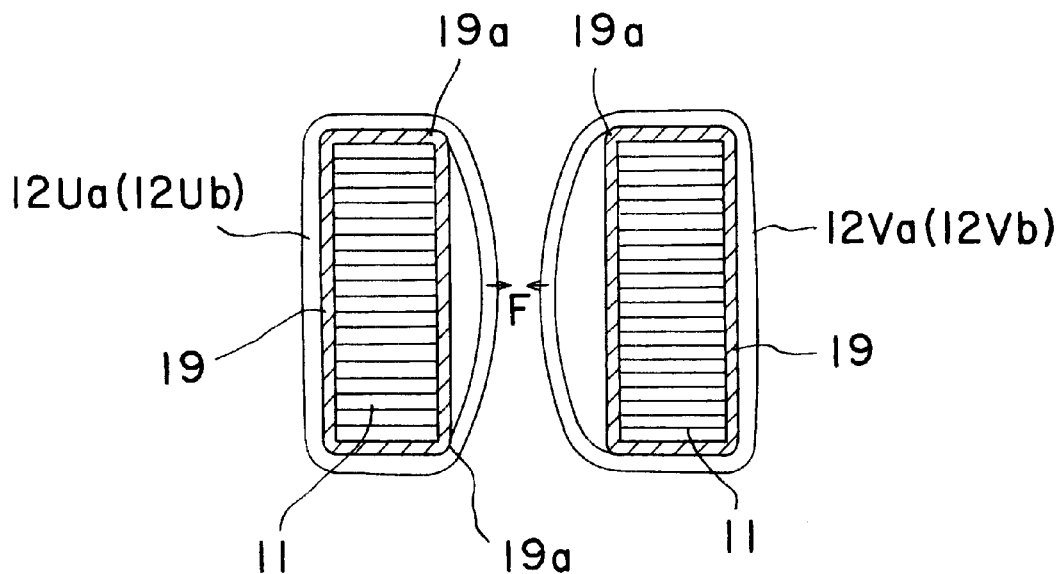
FIG. 14 is an explanatory view showing attracting forces acting on the stator windings when flowing the direct current to the stator windings for magnetization.

If wound in the complete alignment as illustrated in FIG. 2, the upper-layer winding move to intrude in between the lower-layer windings, and a large force acts to expand outward the flange members 23a of the insulating bobbin 23, with the result that the proximal portions of the flange members 23 become easy to be flawed when the attracting forces F as shown in FIG. 14 are generated during the magnetizing process.

Figure 8:
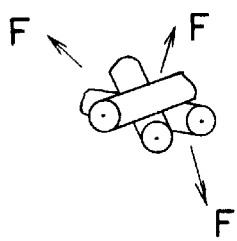
FIG. 8 is an explanatory view showing forces acting on winding conductors intersecting each other.

By contrast, in the construction in the second embodiment, as shown in FIG. 8, a conductor extending direction of the lower-layer winding and a conductor extending direction of the upper-layer winding are crossed, and therefore, even when the attracting forces F appear during the magnetizing process, it is possible to prevent such a situation that the upper-layer winding intrudes in between the lower-layer windings. As a result, the force acting on the flange members 23a of the insulating bobbin 23 can be reduced, and the proximal portions of the flange members can be prevented from being flawed.

Figure 9:
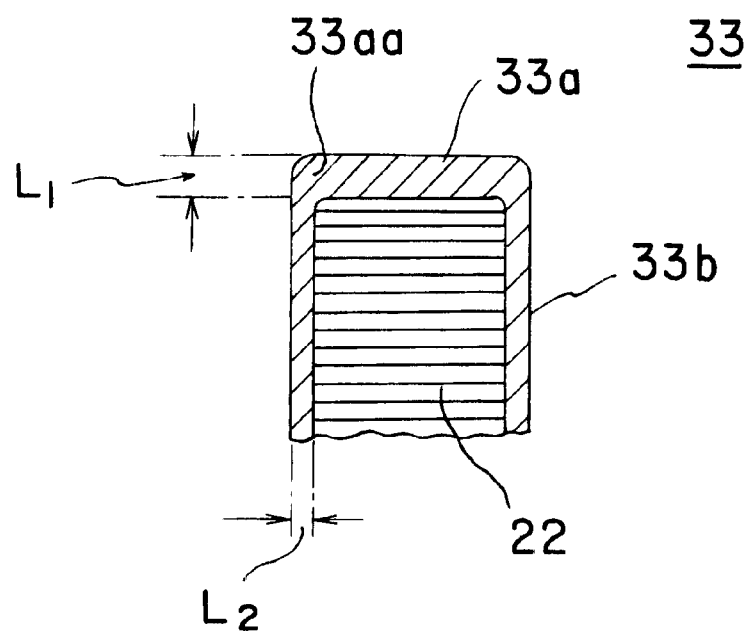
FIG. 9 is a perspective view showing one example of a bobbin used in the motor of the present invention.

FIG. 9 shows a third embodiment of the present invention. The third embodiment is that a vertical thickness of the insulating bobbin 33 composed of an insulating material, i.e., a thickness L1 of an end plate 33a contiguous to both of end surfaces of the pole tooth 22 of the stator core 21, is set larger than a thickness L2 of a side plate 33b positioned inwardly of a slot of the pole tooth 22, thereby enhancing a mechanical strength of the end plate 33a. The end plate 33a may be made thicker on the whole, and the corner portion 33aa and the flange member, which are easily be flawed, may also be made thicker to enhance the strengths thereof.

Incidentally, the mechanical strength can be enhanced by increasing the thickness of the whole insulating bobbin 33. While on the other hand, there might arise inconvenience in which a space within the slot of the stator core 21 wound with the windings diminishes.

In the construction in accordance with the third embodiment, the mechanical strength of the insulating bobbin 33 is enhanced, and therefore, even if the attracting forces F are generated when magnetizing, the insulating bobbin 33 can be prevented from being damaged.

The respective embodiments discussed above, even when each solely carried out, exhibit the effect of being capable of preventing the windings and the insulating bobbin from being damaged, and are capable of exhibiting further effects by their being combined.

Figure 10:
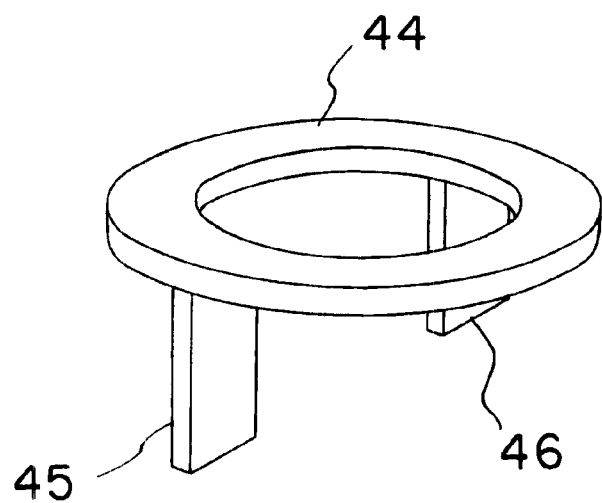
FIG. 10 is a perspective view showing a further example of the spacer according to the present invention.
Figure 11:
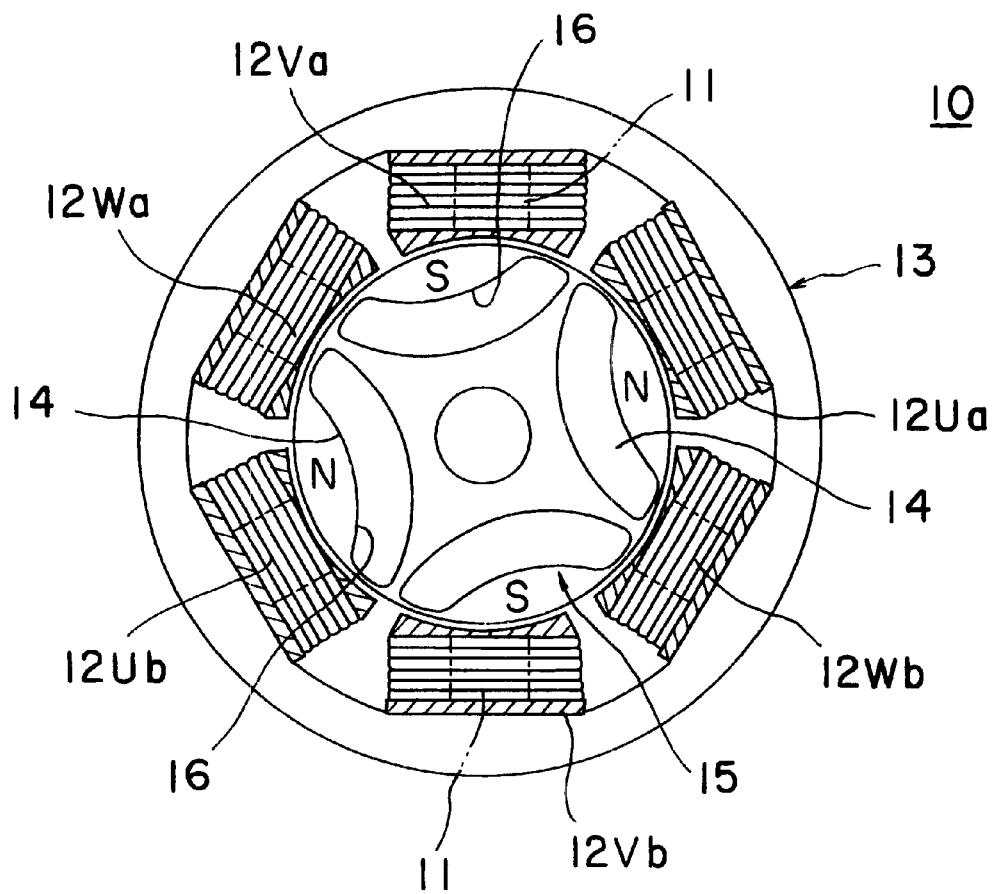
FIG. 11 is an end view showing a conventional permanent magnet motor.

FIG. 10 illustrates a fourth embodiment. A contrivance in the fourth embodiment is not that the spacers 28A are separately inserted in between the respective windings, but that a plurality of spacers 45, 46 are provided erect integrally on an annular connection member 44 and can be there by inserted and removed at one time. This simplifies the insertion and removal of the spacers 45, 46, and the magnetizing process can be executed in a short period of time.

The connection member 44 is not limited to the annular shape but may take arbitrary configurations such as a rectangular plate member, and the connection member 44 and the spacers 45, 46 may be integrally formed or separately formed and fixed to each other.

Note that there has been described the method of magnetizing the four pieces of permanent magnets with the stator core having the six pole teeth in each of the embodiments discussed above, however, the present invention is not limited to this method.

Further, there has been exemplified the case where the direct current flows to the 2-phase stator windings when magnetizing, however, the present invention can be applied to a decrease in fault due to the attracting force caused when magnetizing by electrifying the 3-phase stator windings with the direct current.

Moreover, the spacers are inserted in between the multi-layer windings through which the direct current flows to the different-phase windings, but may be inserted in or removed from between all the multi-layer windings. If done in this way, there is eliminated the necessity for selecting the inserting positions and inserting the spacers therein when magnetizing, and hence the magnetizing operation can be further facilitated.

What is claimed is:

1. A method of magnetizing a permanent magnet motor, comprising the steps of:
    preparing an incomplete permanent magnet motor, which is constructed of a stator having stator windings wound in multi-layers on a plurality of magnetic pole teeth of a stator core respectively through an insulating bobbin, and a rotor including unmagnetized magnet material disposed in a rotor core;
    inserting a spacer in a gap in a slot between said two stator windings wound on the adjacent magnetic teeth;
    magnetizing the magnet material by electrifying said stator windings with a direct current in a state of said spacer being inserted therebetween, and thus forming a permanent magnet; and
    removing said spacer after finishing said step of magnetizing.

2. A method of magnetizing a permanent magnet motor according to claim 1, wherein said spacer is inserted in between a pair of windings through which at least an electric current flows in the same direction among pairs of windings of adjacent slots.

3. A method of magnetizing a permanent magnet motor according to claim 2, wherein a peripheral thickness of said spacer is 70%–110% of the gap between said stator windings.

4. A method of magnetizing a permanent magnet motor according to claim 3, wherein a front end portion of said spacer is formed so that a peripheral width thereof is set smaller than that of a principal portion.

5. A method of magnetizing a permanent magnet motor according to claim 4, wherein the front end portion of said spacer is formed so that a radial width thereof is smaller than that of the principal portion.

6. A method of magnetizing a permanent magnet motor according to claim 5, wherein a plurality of said spacers are integrally inserted in and removed from between said stator windings.

7. A method of magnetizing a permanent magnet motor according to claim 4, wherein a plurality of said spacers are integrally inserted in and removed from between said stator windings.

8. A method of magnetizing a permanent magnet motor according to claim 3, wherein the front end portion of said spacer is formed so that a radial width thereof is smaller than that of a principal portion.

9. A method of magnetizing a permanent magnet motor according to claim 8, wherein a plurality of said spacers are integrally inserted in and removed from between said stator windings.

10. A method of magnetizing a permanent magnet motor according to claim 3, wherein a plurality of said spacers are integrally inserted in and removed from between said stator windings.

11. A method of magnetizing a permanent magnet motor according to claim 2, wherein a front end portion of said spacer is formed so that a peripheral width thereof is set smaller than that of a principal portion.

12. A method of magnetizing a permanent magnet motor according to claim 11, wherein the front end portion of said spacer is formed so that a radial width thereof is smaller than that of the principal portion.

13. A method of magnetizing a permanent magnet motor according to claim 12, wherein a plurality of said spacers are integrally inserted in and removed from between said stator windings.

14. A method of magnetizing a permanent magnet motor according to claim 11, wherein a plurality of said spacers are integrally inserted in and removed from between said stator windings.

15. A method of magnetizing a permanent magnet motor according to claim 2, wherein the front end portion of said spacer is formed so that a radial width thereof is smaller than that of a principal portion.

16. A method of magnetizing a permanent magnet motor according to claim 15, wherein a plurality of said spacers are integrally inserted in and removed from between said stator windings.

17. A method of magnetizing a permanent magnet motor according to claim 2, wherein a plurality of said spacers are integrally inserted in and removed from between said stator windings.

18. A method of magnetizing a permanent magnet motor according to claim 1, wherein a peripheral thickness of said spacer is 70%–110% of the gap between said stator windings.

19. A method of magnetizing a permanent magnet motor according to claim 18, wherein a front end portion of said spacer is formed so that a peripheral width thereof is set smaller than that of a principal portion.

20. A method of magnetizing a permanent magnet motor according to claim 19, wherein the front end portion of said spacer is formed so that a radial width thereof is smaller than that of the principal portion.

21. A method of magnetizing a permanent magnet motor according to claim 20, wherein a plurality of said spacers are integrally inserted in and removed from between said stator windings.

22. A method of magnetizing a permanent magnet motor according to claim 19, wherein a plurality of said spacers are integrally inserted in and removed from between said stator windings.

23. A method of magnetizing a permanent magnet motor according to claim 18, wherein the front end portion of said spacer is formed so that a radial width thereof is smaller than that of a principal portion.

24. A method of magnetizing a permanent magnet motor according to claim 23, wherein a plurality of said spacers are integrally inserted in and removed from between said stator windings.

25. A method of magnetizing a permanent magnet motor according to claim 18, wherein a plurality of said spacers are integrally inserted in and removed from between said stator windings.

26. A method of magnetizing a permanent magnet motor according to claim 1, wherein a front end portion of said spacer is formed so that a peripheral width thereof is set smaller than that of a principal portion.

27. A method of magnetizing a permanent magnet motor according to claim 26, wherein the front end portion of said spacer is formed so that a radial width thereof is smaller than that of the principal portion.

28. A method of magnetizing a permanent magnet motor according to claim 27, wherein a plurality of said spacers are integrally inserted in and removed from between said stator windings.

29. A method of magnetizing a permanent magnet motor according to claim 26, wherein a plurality of said spacers are integrally inserted in and removed from between said stator windings.

30. A method of magnetizing a permanent magnet motor according to claim 1, wherein the front end portion of said spacer is formed so that a radial width thereof is smaller than that of a principal portion.

31. A method of magnetizing a permanent magnet motor according to claim 30, wherein a plurality of said spacers are integrally inserted in and removed from between said stator windings.

32. A method of magnetizing a permanent magnet motor according to claim 1, wherein a plurality of said spacers are integrally inserted in and removed from between said stator windings.

* * * * *